United States Patent [19]

Schulte et al.

[11] 4,448,862

[45] May 15, 1984

[54] LEAD STORAGE BATTERY

[75] Inventors: Heinz Schulte; Werner Kirchhoff, both of Hagen, Fed. Rep. of Germany

[73] Assignee: Varta Batterie Aktiengesellschaft, Hanover, Fed. Rep. of Germany

[21] Appl. No.: 232,386

[22] Filed: Feb. 6, 1981

[30] Foreign Application Priority Data

Feb. 13, 1980 [DE]  Fed. Rep. of Germany ....... 3005297

[51] Int. Cl.$^3$ .............................................. H01M 2/14
[52] U.S. Cl. .................................... 429/136; 429/144; 429/146
[58] Field of Search ............... 429/132, 136, 142, 144, 429/145, 225–228, 143, 146

[56] References Cited

U.S. PATENT DOCUMENTS

| Re. 23,644 | 4/1953 | Grant | 429/144 |
|---|---|---|---|
| 1,990,976 | 2/1935 | Booss | 429/136 |
| 2,511,887 | 6/1950 | Vinal | 429/144 |
| 2,607,810 | 8/1952 | Walker | 429/144 X |

*Primary Examiner*—Anthony Skapars
*Attorney, Agent, or Firm*—Weiser, Stapler & Kimmelman

[57] ABSTRACT

The coating of the microporous separators of lead storage batteries with a highly porous glass wool mat on the side facing the negative electrode plates promotes the electrolyte exchange at these plates and also counteracts the tendency toward crumbling and toward the formation of spongy lead (mossing). The glass wool mat may be applied in the form of a plate or a slab to conventionally made separators or it may take the form of a pocket into which the negative electrode plate is inserted.

9 Claims, No Drawings

LEAD STORAGE BATTERY

The invention relates to a lead storage battery with positive and negative electrode plates between which microporous separators are positioned.

For the electrical separation of the positive and negative plates there are used today almost exclusively microporous separators of rubber or plastic. For example, a known separator material is acid resistant polyvinyl chloride which is sintered or hot pressed out of powder into thin wall foils, if desired with the aid of pore-forming substances. It is desirable that the known separators exhibit a distance-maintaining profile in the form of waves or ribs, or that they be provided with parallel lands so that there will be ensured permeability for the gases of electrolysis which arise during battery operation into the space above the electrolyte surface and to the exterior.

In the conventional assembly of a plate block, the separators provided with ribs are always so positioned that the ribs face the positive electrode. This has the purpose of keeping the separator material as far away as possible from the corrosive effect of the oxygen which evolves there. On the other hand the smooth side of the separator lies directly adjacent the negative electrode.

In this situation, the microporous character of the separator necessarily causes the acid exchange at the negative plate to be adversely affected. As a further consequence this leads to premature sulfation of the negative plates. This, in turn, leads to a reduction of their individual potentials and therefore to a capacity limitation by the negative plates. Porous layered separators which lie immediately adjacent the negative electrodes and which are made, for example, of polyethelene are known from German Patent Publications (Offenlegungsschrift) 24 06 412 or 26 101 16. On their other sides, i.e. toward the positive electrode, these separators exhibit a coating with a glass fiber woven structure. This provision is intended to improve the useful life of the positive electrode.

The object of the present invention is to provide a separation technique which particularly improves the electrolyte exchange in the negative electrode.

This and other objects which will appear are achieved in accordance with the present invention by providing each separator, on that side which faces the negative plate, with an additional hydrogen and acid resistant layer of high porosity.

It has been found particularly desirable that this additional layer be of glass wool matting. It has been found that, due to its good wettability and also because of its loose capillarity, this provides excellent permeability to the acid electrolyte. By so doing it creates in the vicinity of the negative electrode precisely those conditions which are necessary for adequate acid exchange. In addition glass wool matting is unaffected by nascent hydrogen.

The thickness of the glass wool mat layer should be from 0.2 to 1.0 mm., and preferably about 0.3 mm. In the simplest case, this separator layer, for example in the form of a plate or slab of matting, can be superposed upon a microporous separator of conventional manufacture and can be mounted as connecting separator with the matting applied oriented toward the negative electrode.

In a particularly desirable embodiment, the additional glass wool mat layer is formed as a pocket rather than as a slab or plate into which the negative electrode can be inserted.

The separation in accordance with the invention has the effect that the crumbling of the positive and negative electrodes is diminished by about 10%, which simultaneously reduces the risk of short circuits by debris deposited on the bottom. This necessarily yields a greater useful life for the cell.

Due to the more intensive acid exchange between the negative plate and the matting applied in accordance with the invention better heat transport is also produced. This results in a reduction of the cell temperature by about 5° C. As a result the positive grid is subject to less corrosion.

By means of the separation technique embodying the invention the lead sponge formation at the top edges of the negative plates, the so-called mossing, is also decidedly reduced. It is thought that, by proceeding in accordance with the present invention, there is counteracted a directional growth of fine lead crystal needles, with resulting bridge formation to the adjoining positive plates. In experiments it has been found that the intensity of mossing formation after 1500 cycles using the separation technique of the invention amounts to about 4 to 8 mm, whereas for separation without glass wool matting it amounts to about 15 to 20 mm.

We claim:

1. A lead storage battery with positive and negative electrode plates between which are positioned the microporous separators, comprising:
    on each separator, an additional hydrogen and acid resistant layer of high porosity glass wool mat applied only to the side facing the negative plate.
2. The battery of claim 1 wherein the additional layer has a thickness of 0.2 to 1.0 mm.
3. The battery of claim 2 wherein the thickness is about 0.3 mm.
4. The battery of claim 1 wherein the additional layer surrounds the negative electrode in the form of a pocket into which the negative electrode is inserted.
5. The battery of claim 1 wherein the separators are formed of a connecting spacer of microporous separator foil and glass wool mat applied thereto.
6. The battery of claim 1 wherein
    the separator is of microporous rubber or plastic foil and is provided with means for spacing it from the adjacent positive electrode,
    the additional layer being directly adjacent the negative plate.
7. The battery of claim 6 wherein
    the spacing means between separator and positive plate are lands or ribs, while the side of the separator toward the negative plate is smooth.
8. The battery of claim 7 wherein
    the additional layer is between the negative plate and the smooth side of the separator.
9. A lead storage battery with positive and negative electrode plates between which are positioned the microporous separators, comprising:
    on each separator, an additional hydrogen and acid resistant layer of high porosity glass wool mat applied only to the side facing the negative plate,
    the separator being provided with lands or ribs for spacing it from the adjacent positive electrode, while the side of the separator toward the negative plate is smooth, and
    the additional layer being directly adjacent the negative plate between that negative plate and the smooth side of the separator.

* * * * *